(12) United States Patent
Leontaridis (10) Patent No.: US 7,509,780 B2
(45) Date of Patent: Mar. 31, 2009

(54) JOINT FOR THE ANGULAR CONNECTION OF DOOR WINDOW PROFILE FRAMES AND THE LIKE

(76) Inventor: Athanasios Leontaridis, Voporou 61, GR-171 24 Nea Smirni Attikis (GR)

( * ) Notice: Subject to any disclaimer, the term of this patent is extended or adjusted under 35 U.S.C. 154(b) by 563 days.

(21) Appl. No.: 10/530,547

(22) PCT Filed: Oct. 9, 2003

(86) PCT No.: PCT/GR03/00044

§ 371 (c)(1), (2), (4) Date: Apr. 7, 2005

(87) PCT Pub. No.: WO2004/033837

PCT Pub. Date: Apr. 22, 2004

(65) Prior Publication Data

US 2006/0059843 A1 Mar. 23, 2006

(30) Foreign Application Priority Data

Oct. 9, 2002 (GR) .......................... 20020100440

(51) Int. Cl.
*E04C 2/38* (2006.01)
(52) U.S. Cl. .................... 52/656.9; 52/655.1; 52/656.4; 52/656.5; 52/656.6; 403/402; 403/297
(58) Field of Classification Search ............... 52/656.9, 52/655.1, 656.4–656.6, 204.5, 204.1; 403/402, 403/231, 297, 328; 74/502.3
See application file for complete search history.

(56) References Cited

U.S. PATENT DOCUMENTS

| 3,163,264 | A | | 12/1964 | Gondry | |
| 3,782,054 | A | * | 1/1974 | Goss, Jr. | 403/295 |
| 3,848,390 | A | * | 11/1974 | Anderson et al. | 52/656.9 |
| 3,877,138 | A | * | 4/1975 | Suchowski | 29/468 |
| 3,967,910 | A | * | 7/1976 | Tollefsrud | 403/402 |
| 4,076,438 | A | * | 2/1978 | Bos | 403/402 |
| 4,387,546 | A | * | 6/1983 | Kurita et al. | 52/847 |
| 5,109,645 | A | | 5/1992 | Bucci | |
| 5,671,580 | A | * | 9/1997 | Chou | 52/656.4 |
| 5,907,937 | A | * | 6/1999 | Loftus et al. | 52/308 |

(Continued)

FOREIGN PATENT DOCUMENTS

DE 3726594 2/1989

(Continued)

*Primary Examiner*—Brian E. Glessner
*Assistant Examiner*—James J Buckle, Jr.

(57) ABSTRACT

The angular joint of the invention comprises a slide base portion (1) and a sheet metal mobile portion (2) superimposed thereupon, the sheet metal portion (2) including upwardly extending legs (2e) with indenting edges (2g), a bolt (3) being employed in the tightening process of the joint, wherein after the joint has been inserted into the hollow profile members being brought together for connection, the bolt (3) acts so as to exert an upwardly raising force onto the sheet metal mobile portion (2), whilst maintaining base portion (1) at a fixed position, and subsequently leading the sharp indenting edges (2g) of the sheet metal portion (1) to producing an indentation effect into the walls of the corresponding chambers (13a, 13b) of the hollow profiles being angularly connected with the joint, as the joint is being tightened, thereby resulting in a robust, self aligned connection of the hollow profile members.

9 Claims, 8 Drawing Sheets

U.S. PATENT DOCUMENTS

6,042,298 A * 3/2000 Mastrogiannis et al. ..... 403/402
2002/0139079 A1 * 10/2002 Brady ..................... 52/653.1

FOREIGN PATENT DOCUMENTS

| EP | 0100733 | 2/1984 |
| EP | 0644312 | 3/1995 |
| EP | 1054133 | 11/2000 |
| GB | 2072296 | 9/1981 |

* cited by examiner

JOINT FOR THE ANGULAR CONNECTION OF DOOR WINDOW PROFILE FRAMES AND THE LIKE

THE FIELD OF THE ART

The invention relates to an angular joint employed in the process of angular connections of hollow profiles, such as in the orthogonal connections of profiles being previously cut at 45° and coming to contact to form parallelepipedal frames for doors or windows.

Joints for door and window profile frames of the prior art of the type of spring activated button means removably engaging into suitable apertures of the profiles to stabilize the angular connection thereof, require, prior to employment thereof, the opening of apertures at precisely selected locations of the profiles wherein are removably engaged the abovementioned spring activated buttons. This process is awkward and time consuming due to the accuracy required in marking and drilling of the apertures and often leads to an imperfect fit of the profiles and to a structure of reduced aesthetics and functionality due to the non-alignment of the profiles.

EP 0 644 312 discloses a set-square connecting structure for right angle connections of profile frames for frames for doors and windows, wherein a pair of apertures is required in the profiles being brought for connection, for engagement of protruding teeth of the connecting structure into these apertures and the safe locking of the profile sections with one another. EP 0235 039 and FR 2 429 350 also disclose connecting devices for the assembly of tubular profiles for the formation of door/window frames, which function through the engagement of protruding buttons into correspondingly sized side apertures in the profiles being brought together for connection.

Similarly WO 02/075093 and U.S. Pat. No. 6,042,298 also require the accurate opening of side apertures onto the profiles to be connected, and they further include a plurality of components that make the joint rather complex and of increased manufacturing and assembly cost.

GB-2 072 296 discloses a joint wherein a clamping member is moved through a bolt being screwed along the line of matching contact of the profiles so that opposed hooks of the clamping member are drawn into engagement with punched depressions in the outside walls of the hollow sections being connected. Application of such a joint in practice requires employment of the specific type of profile being proposed in this patent, whilst the requirement of punched depressions at precisely measured locations, worse than the ripening of side apertures onto the profiles to be connected wherein the nature of openings might allow marginal fitting tolerances, poses a further problem that the dimensions of the profiles having being cut and punched or perforated industrially cannot be altered on site, as their installation might require, because the punches/perforations would move out of place and would therefore render the joint inapplicable.

U.S. Pat. No. 5,109,645 discloses a symmetrical shaped metal angle piece with resilient end portions and sharp edged terminations, that slides freely on being entered within the hollow profile sections being connected, but thereafter locks into engaged, non withdrawable relation, due to the reversed attitude of the resilient end portions and their associated sharp edges. Although this joint is mainly directed to serve a permanent connection of the profiles, if disconnection of the frame is desired, one has to attempt, through slots in the profile walls, to pry inwardly the profiles and release them from jamming engagement. Although simple, the joint in U.S. Pat. No. 5,109,645 is unable of obtaining perimetrically precise contact of the profiles being connected, thereby leading to technical and aesthetic drawbacks, whilst its structure does not render it capable or withstanding heavy loads in the range of tons, normally required with door/window frames, without creating undesirable gaps along the plane of matching contact of the hollow profile sections.

The object of the present invention is to provide for an angular joint or hollow metallic profile members being brought together for the formation of door or window frames and the like, said angular joint being simple in construction, easily assembled or disassembled and providing a self-aligned, rigid connection of the profile members.

A further object of the invention is the elimination of the need for accurately marking and subsequently opening of side apertures onto the profile members being connected, thereby substantially facilitating and speeding up of the assembly process.

Another object of the invention is to provide for alternative embodiments of the joint of the invention, adapting it to various applications extending beyond the field of orthogonal connections of hollow profile members being connected to form door and window frames and making the joint of the invention applicable in connections of profile members or any kind and at any angle whatsoever.

The angular joint of the invention comprises a slide base portion 1 and a sheet metal mobile portion 2 superimposed thereupon, the sheet metal portion 2 including upwardly extending legs 2e with indenting edges 2g, a bolt 3 being employed in the tightening process of the joint, wherein after the joint has been inserted into the hollow profile members being brought together for connection, the bolt 3 acts so as to exert an upwardly raising force onto the sheet metal mobile portion 2, whilst maintaining base portion 1 at a fixed position, and subsequently leading the sharp indenting edges 2g of the sheet metal portion 1 to producing an indentation effect into the walls of the corresponding chambers 13a, 13b of the hollow profiles being angularly connected with the joint, as the joint is being tightened, thereby resulting in a robust, self aligned connection of the hollow profile members.

DETAILED DESCRIPTION OF PREFERRED EMBODIMENTS

The joint of the invention is particularly related with the assembly of frames that are being assembled from previously cut lengths of profiles e.g. aluminium or plastic profiles, such profiles having a hollow section to allow introduction and operation of the joint. A broad, but not exclusive, field of application of the invention is the connection of profile members in the corners thereof, when they are brought together to form generally parallelepipedal frames or casings for door and window applications. Such profile members are previously cut at 45° at the matching edges thereof to allow for an optimally aesthetic fit of the orthogonal connection.

Thus, whilst the joint of the invention has a necessarily orthogonal configuration in the particular application, it may equally well have the configuration of an acute or an oblique angle to serve applications wherein the hollow profile members are connected at an acute or an oblique angle respectively.

The dimensions of the joint of the invention may naturally vary to make it compatible with different sizes and sections of profile members.

Figure 1:
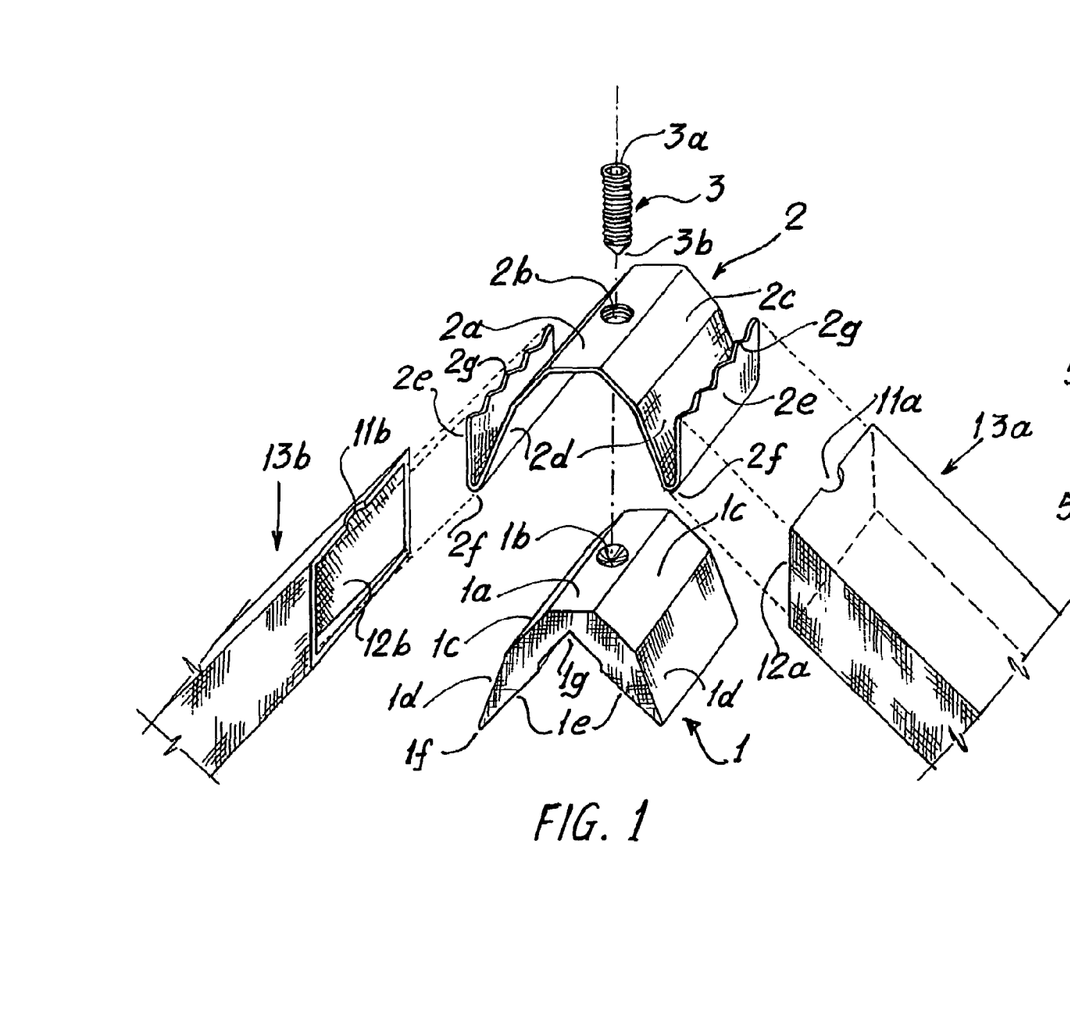
FIG. 1 shows a perspective view of the individual items employed in one first embodiment of the joint of the invention.
Figure 1A:
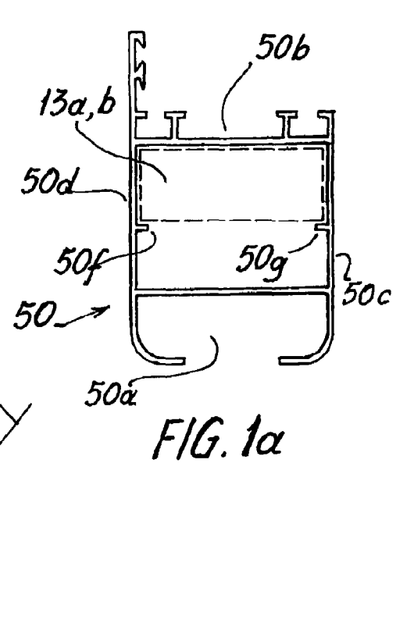
FIG. 1a shows a sectional view of an illustrative type of a profile for the assembly of door and window frames being angularly connected by means of the joint of the invention.

An illustrative hollow profile member 50 is shown in FIG. 1a, such profile member 50 comprising a pair of parallel walls 50c, 50d extending on the one hand at an open end 50a wherein is fitted the item that is being framed by such perimetrically covering length of the profile member, e.g. a glass or shutter panel for a door or window assembly, and on the other hand at and end 50b, opposite to the open end 50a, end 50b being fixedly mounted to the casing. A chamber 13a,b is formed in between 50a and 50b, such chamber serving for the introduction of the joint of the invention. Whilst other details of the profile members to be connected may vary, the chambers 13a,b are available for the employment of the joint of the invention. The drawings therefore depict the abstract detail of such rectangular chambers 13a and 13b with respective open ends 12a, 12b of the hollow profile members being brought together for connection.

The joint of the invention shown in FIG. 1 comprises a fixed slide base portion 1 and an elastically deformable sheet metal portion 2 superimposed onto the fixed slide base portion 1 and having a configuration that generally corresponds to the surface of the base portion 1 whereupon it is being seated. Both portions 1 and 2 are symmetrically arranged on either side of plane x-x' (FIG. 2b), a central bolt 3 with a screwing head end 3a and a sharp edge 3b also passing through the same plane of symmetry x-x' being driven by means of a screw driver 14, wherein this plane of symmetry x-x' coincides with the plane of contact of the two hollow profile members being brought together for connection.

The fixed slide base portion 1 is an angular item with a pair of planar outer sides 1e forming an angle corresponding to the angle at which the profile members are being connected, at this instance an angle of 90°, a slight planar recession 1g being formed near the junction of these outer sides 1e, such planar recession 1g serving as a means of overcoming possible obstacles in the course of sliding of these outer sides 1e onto the walls of corresponding chambers 13a, 13b, that might be due to possible imperfections in the cutting and finishing process of the edges of the metal profile members being brought together for connection. The slide base portion 1 forms a flat basement portion 1a overlying the junction of the above outer sides 1e with a cavity 1b being centrally located thereupon to serve the purpose of receiving the sharp edge 3b of bolt 3.

On either side of the above flat basement portion 1a, that is perpendicularly oriented with regard to the plane of symmetry x-x' the inner sides of the fixed slide base portion 1 extend to a pair of planar sections 1c which are substantially parallel to the walls of profile chambers 13a,b whereupon the outer planar sides 1e are seated and subsequently extend into convergent portions 1d terminating at symmetrically located edges 1f. The herein above described configuration of the sides of the fixed slide base portion 1 substantially improves the characteristics of the process of sliding of the sheet metal mobile portion 2 onto the fixed slide base portion 1 as will be explained hereinafter.

The sheet metal mobile portion 1 has a configuration generally identical with the configuration of the slide base portion 1, with an upper basement 2a with a centrally located cavity 2b wherein is being driven the sharp edge 3b of the tightening bolt 3, wherein the upper basement 2a lies perpendicularly to the plane of symmetry x-x' and symmetrically above the basement 1a of the base portion 1. In turn, the upper basement 2a symmetrically extends to planar side surfaces 2c and 2d, each with a length generally equivalent to the length of underlying surfaces 1c, 1d of the base portion 1, whereupon they slide.

Figure 2A:
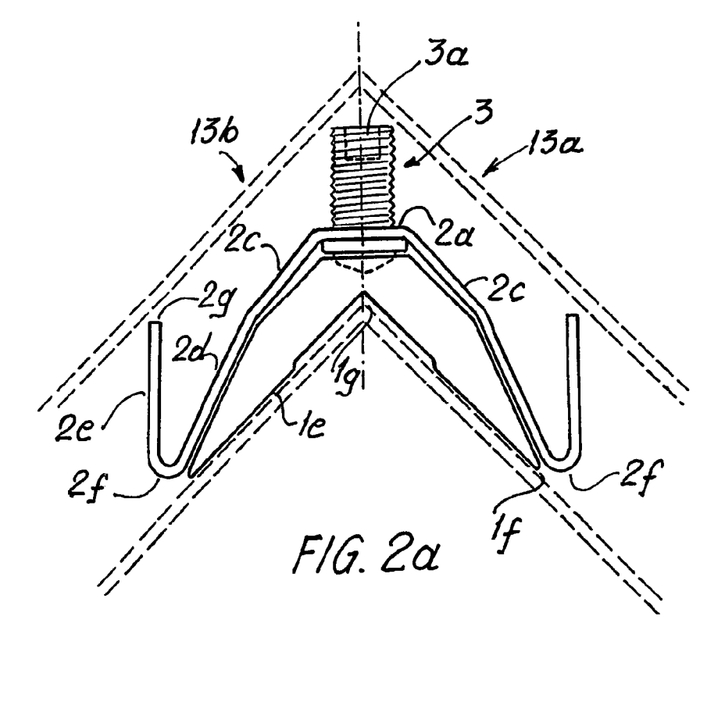
FIGS. 2a-b present the joint of the invention in a position prior to starting and following completion of the angular connection of the two profiles, the ends of which have been previously cut at an angle of 45°.
Figure 2B:
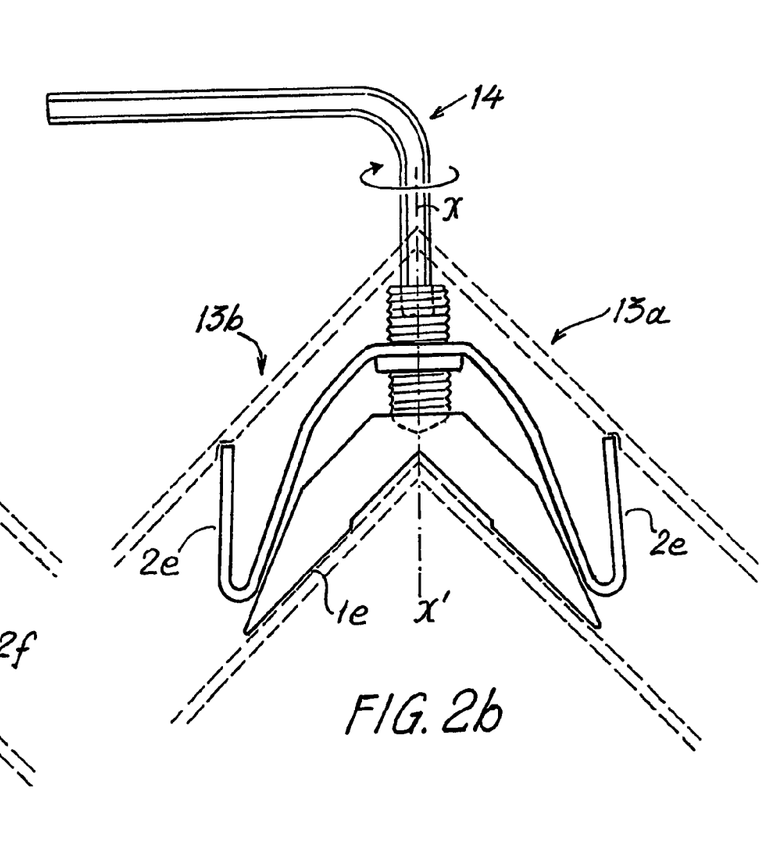
Figure 2C:
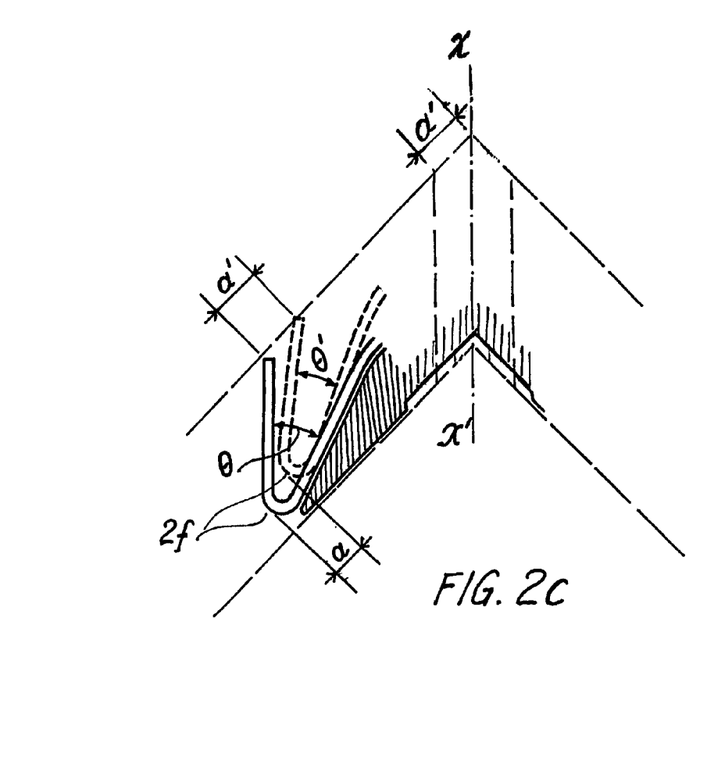
FIG. 2c shows a magnified detail of the movement of the end leg of the mobile portion of the joint of the invention.

The sheet metal mobile portion 2 is bent upwardly at the terminals 2f of side surfaces 2c-d at an angle (180-θ)° as illustrated in FIG. 2c, and extends to upwardly extending sides 2e on either side thereof terminating at sharp edges 2g, such upwardly extending sides 2e thereby being oriented in a direction substantially parallel to the plane of symmetry x-x'.

Figure 7A:
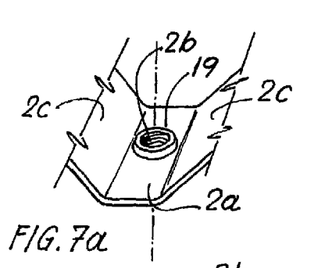
FIGS. 7a-c present in perspective views three alternative, illustrative solutions for opening an aperture with internal threading at the mobile portion of the joint of the invention.
Figure 7B:
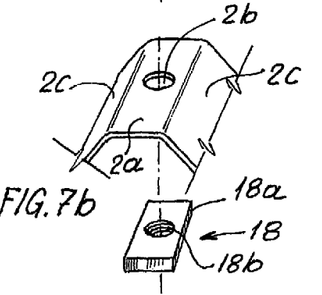
Figure 7C:
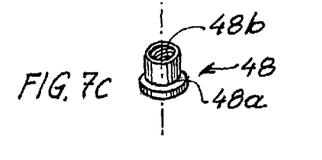

In accordance to a first preferred embodiment of the invention the abovementioned centrally located cavity 2b in the sheet metal mobile portion 2 is drilled through to form an opening with internal threading for the passage of bolt 3. In FIGS. 7a-c are depicted possible alternative solutions for implementing such hole with internal threading. In FIG. 7a hole 2b is being formed by expansion of the sheet metal into a cylindrical collar 19 that is subsequently internally threaded. In FIG. 7b is depicted an alternative solution of employment of an additional plate 18 having a planar surface 18a with dimensions such as to fit onto the basement 2a of the sheet metal portion 2 and a central hole 18b that is internally threaded and coincides with hole 2b on the basement 2a when plate 18 is brought in contact with basement 2a. Finally in FIG. 7c is depicted an additional internally threaded cylindrical collar 48 with a body portion 48a and a central hole 48b coinciding with hole 2b of the sheet metal portion 2.

In the case wherein cavity 2b in the sheet metal portion 2, is drilled through and forms a thorough internally threaded hole, such hole being implemented in either one of the illustrative embodiments of FIGS. 7a-c, bolt 3 is driven through this hole 2b and terminates by contact of the sharp edge 3b thereof onto the cavity 1b being provided axially underneath hole 2b on the fixed slide base portion 1. Whilst this condition corresponds to the joint having been assembled but not tightened as shown in FIG. 2a, when as shown in FIG. 2b, by means of screw driver 14 the bolt 3 is being screwed, the force being exerted by the firm contact of the sharp edge 3b thereof onto the cavity 1b of the slide base portion 1 maintains the latter firmly in contact with the walls of the profiles being connected, whilst it produces a reactive force that pushes upwardly the sheet metal mobile portion 1 until the sharp edges 2g thereof indent the relatively softer walls of the profile members being connected, thereby achieving a robust, self aligned connection thereof, such self alignment being obtained as a result of the abovementioned indenting of the walls of the profile members extending along a substantial length of the sharp edges 2g of the sheet metal mobile portion 1.

FIG. 2c characteristically depicts a magnified view of a detail in the process of tightening of the joint of the invention. Herein is shown that following indenting of the sharp edges 2g of the sheet metal portion 1 into the walls of corresponding chambers 13a, 13b of the profiles to be connected, further screwing of bolt 3 results in a perfect convergence of the profiles to be connected along the axis of symmetry x-x', whilst the upwardly extending sides 2e of the sheet metal portion 2 move through an infinitesimal distance a', having a length of the order of a fraction of a mm, thereby being deflected at an angle $\theta'^\circ$ relatively to the side surfaces 2d of the sheet metal mobile portion 2. Resilient stresses are thereby stored in sheet metal portion 2, uniformly applied on either side of the joint, such stresses thereby maintaining the joint in a tightened condition and the profile members rigidly connected even if an accidental slight release of bolt 3 may occur.

Figure 3:
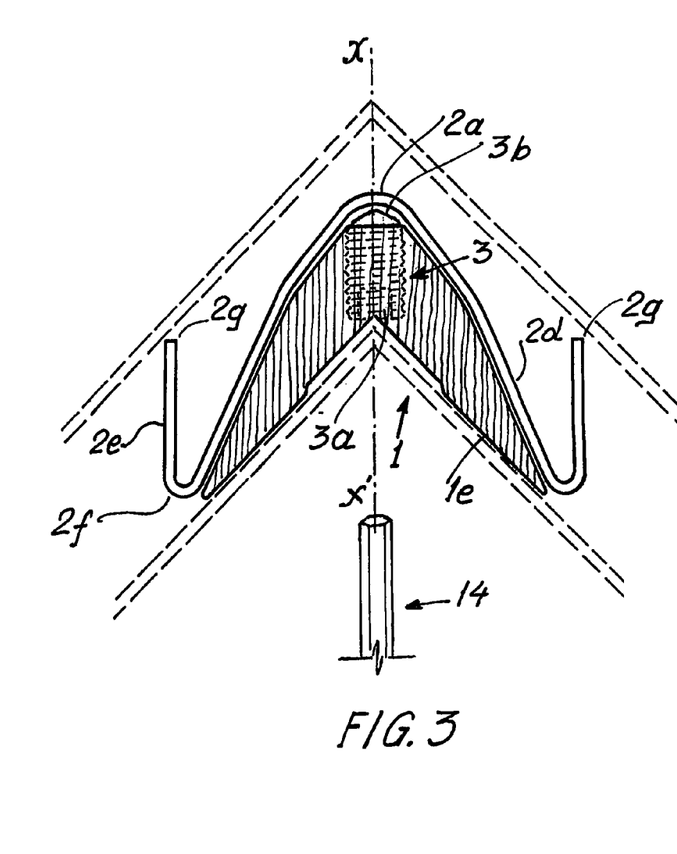
FIG. 3 shows a sectional view of an alternative embodiment of the invention wherein the bolt means used for tightening of the joint passes through the fixed slide base portion of the joint.

In accordance to an alternative embodiment of the invention, instead of opening a hole through the above cavity 2b in the sheet metal mobile portion 2, a hole is drilled through the corresponding coaxial cavity 1b of the fixed slide base portion 1 as shown in FIG. 3. The bolt 3 is then being driven from the inner junction of the profiles to be connected and sharp edge 3b thereof firmly contracts sheet metal portion 2 at cavity 2b thereof and exerts a raising force thereupon, eventually resulting in the indentation of the walls of the profiles to be connected by the sharp edges 2g of the upwardly extending sides 2e of the sheet metal mobile portion 2.

The form of the sharp edges 2g of the upwardly extending sides 2e of the sheet metal mobile portion 2 is selected so as to render an optimum indentation effect. Thus, they may for example have the toothed form depicted in FIG. 1 or FIG. 4a and FIG. 4b or they may take the double razor edge like form of edges 20g in the upwardly extending sides 20e of an alternative embodiment of the invention depicted in FIGS. 5, 5a, wherein the mobile portion 2 of the joint of the invention is made from a profile of hard aluminium alloy with an upper basement 20a provided with a centrally located hole 20b and sides 20c-20d in sliding contract with corresponding sides of the underlying slide base portion 1. A single razor edge ending of upwardly extending sides 20e of the mobile portion 20 made from hard aluminium alloy may be equally effective in the indentation of the relatively softer walls of the hollow profiles to be connected, however the double razor edge like configuration further serves the purpose of a secure sequential indentation of the walls of the profile members.

Figures 5, 5A, 5B, 5C:
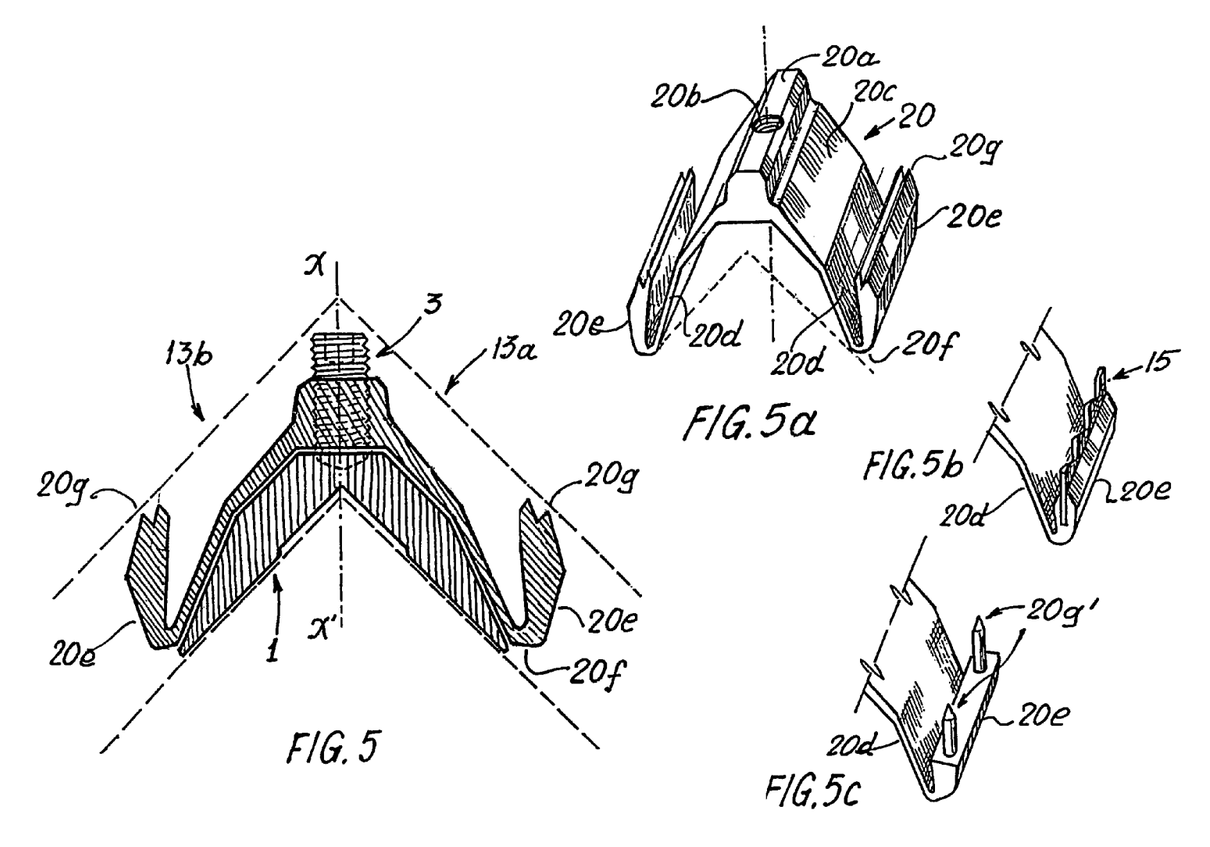
FIGS. 5 and 5a-c present in perspective various alternative embodiments of the joint of the invention and mainly of the sharp edges of the end legs of the mobile portion thereof.

Alternatively, as shown in FIG. 5b, the upwardly extending legs 20e of the mobile portion 20 may form a recession, wherein an independent sheet metal plate 15, preferably with toothed edge configuration may be fitted to serve as an indentation means.

A further alternative embodiment is shown in FIG. 5b, wherein legs 20e may extend to a plurality of pointed pins 20g'.

Figure 6A:
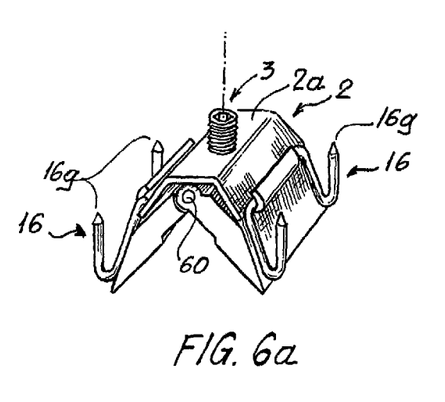
FIGS. 6a-b present in a perspective view and a sectional view respectively another embodiment of the joint of the invention.
Figure 6B:
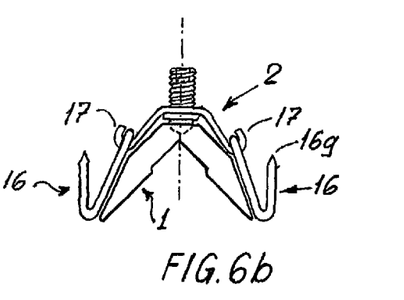

Finally in FIGS. 6a, 6b the sheet metal portion 2 is alternatively made with side surfaces 2c ending at a bent structure of the sheet metal portion forming a recession 17 for the engagement of a wire 16, made from steel in the form of a Π section in substitution of the otherwise planar sides 2d of the sheet metal portion 2, with the legs thereof bent to upwardly extending members with sharp edges 16g playing the role of profile wall indentation elements. In this embodiment, the fixed base portion 1 may be made in two identical portions, symmetrically on either side of the plane of symmetry x-x', the two identical portions being pivotally connected around a pivotal axis 60 and thereby being appropriate for the connection of hollow profiles forming varying angles at the junction thereof. The sheet metal mobile portion 2 might under such circumstances also be adjustable to profile connections at varying angles with the pivotally mounted end portion 16 thereof.

Figure 4A:
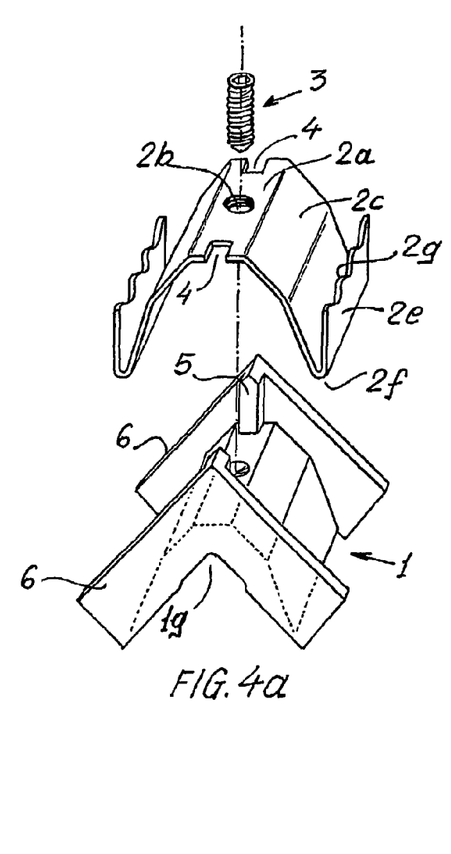
FIGS. 4a-4c present in a perspective view various alternative embodiments of the joint of the invention and mainly of the slide base portion thereof.

The fixed slide base portion 1 of the joint of the invention may also receive alternative forms. In FIG. 4a base portion 1 is provided with elevated end walls 6 with opposing central nerves 5 that fit into recessions 4 of the sheet metal mobile portion 2. Alternatively in FIG. 4c, base portion 1 does not terminate in the abovementioned terminals 1f, but is bent upwardly following a configuration similar to that of the sheet metal portion 2, so that the upwardly extending legs 2e of the latter may fit into the recessions being formed by the upwardly extending legs 1e' of the fixed slide base portion 1.

Figure 4B:
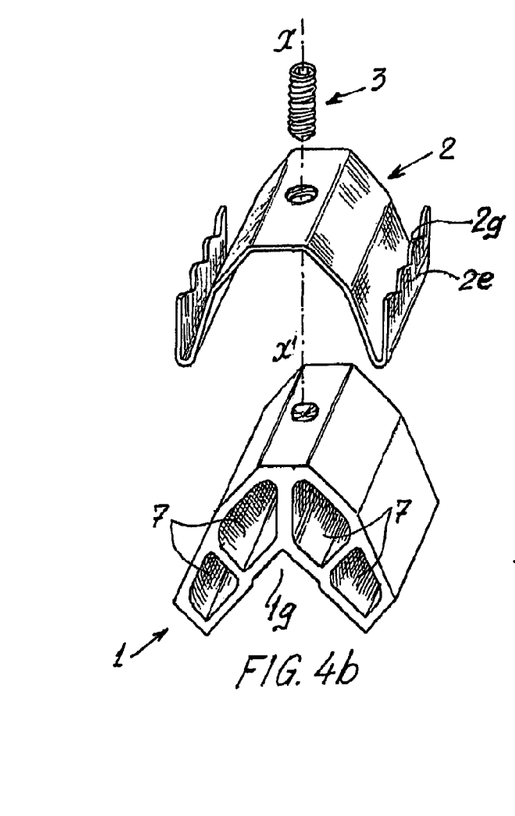
Figure 4C:
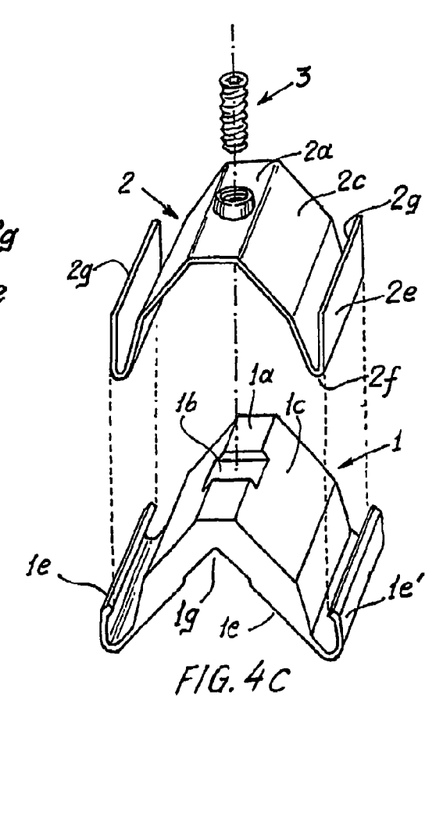

The joint configuration depicted in FIG. 4a and preferably that of FIG. 4c serves as an advantageous embodiment, wherein the sheet metal mobile portion 2 fits tightly into slide base portion 1, so as to facilitate packaging of the joint and enable handling of the same as if it were a single item.

FIG. 4b shows an alternative embodiment of the base portion 1 of the invention, which is more bulky and is applicable in cases of rather wide profile connections, wherein due to the bulk of the base portion 1, it is preferably made with perforations 7, in order to reduce material cost and weight of the item.

Figures 8A, 8B:
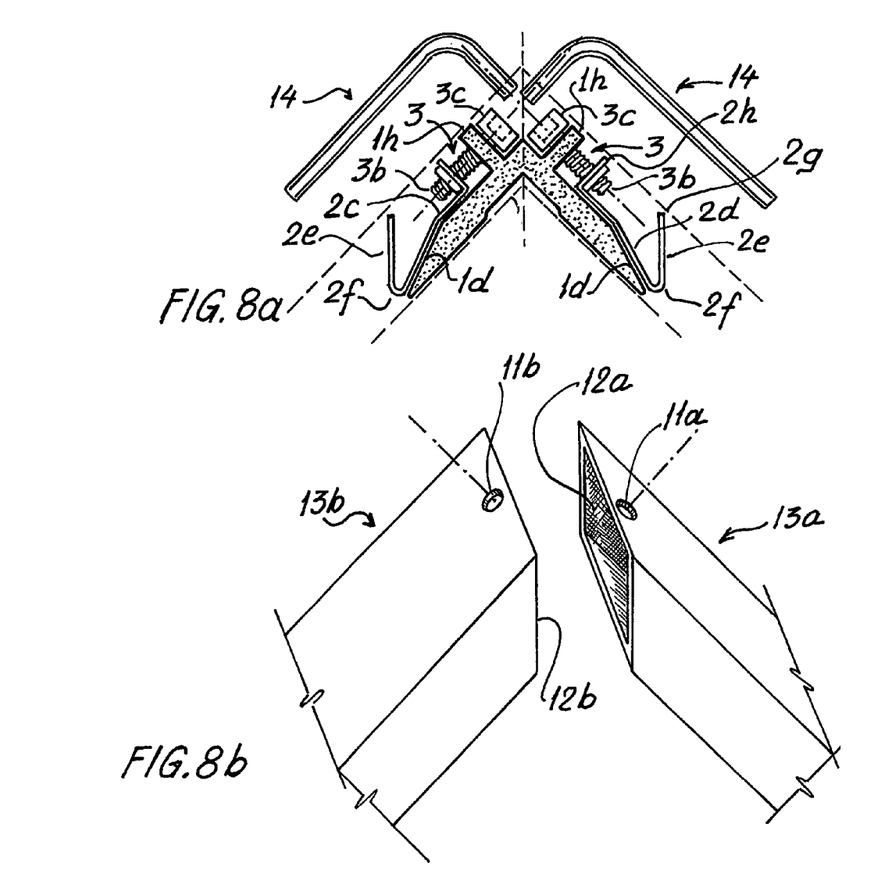
FIGS. 8a and 8b show an alternative embodiment of the invention, wherein the joint is applied with a pair of apertures, one in each one of the profiles to be connected, the joint correspondingly comprising independently driven legs of the mobile portion thereof.
Figures 9A, 9B, 9C:
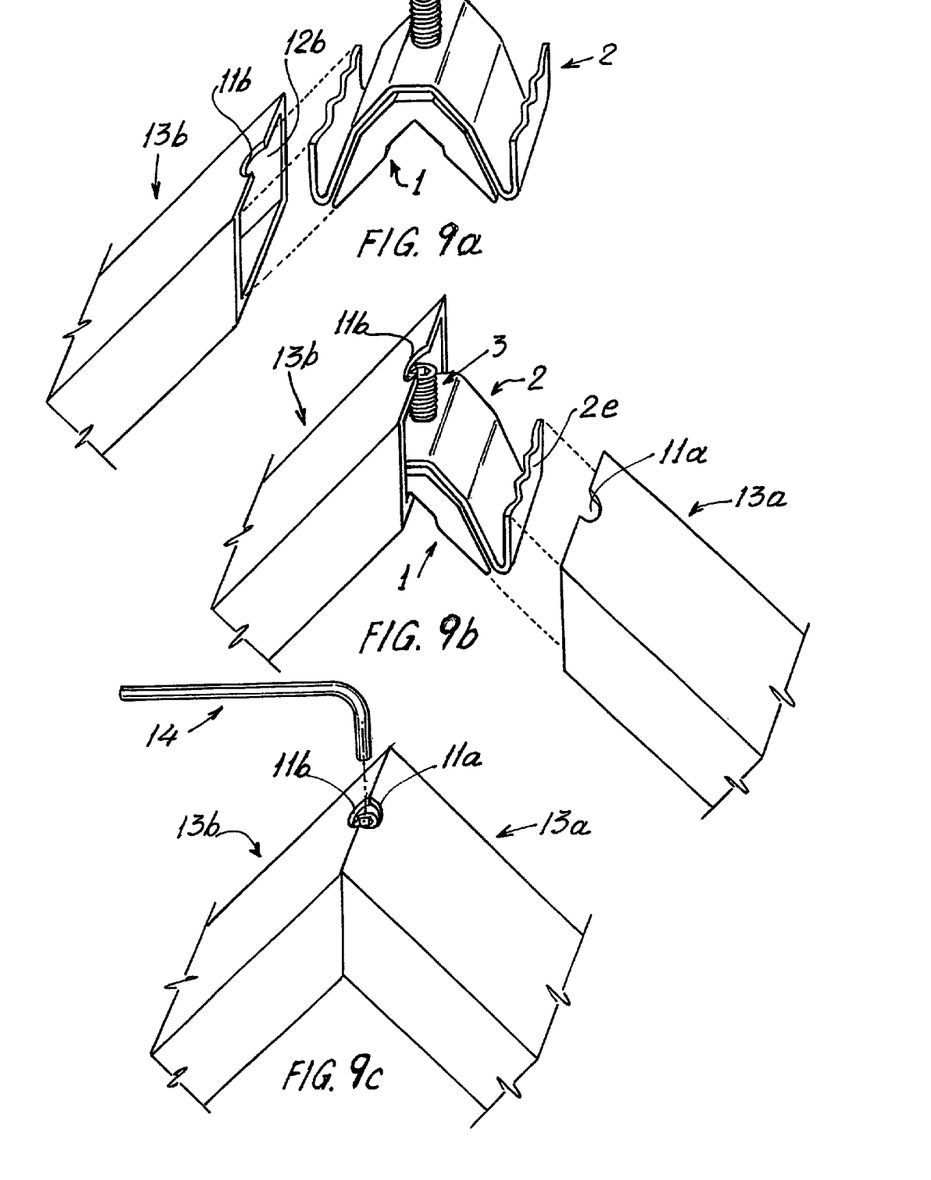
FIGS. 9a-c present in a perspective view the sequential steps in mounting and tightening of the joint of the invention.

FIG. 8a depicts an alternative embodiment of the joint of the invention, wherein the sheet metal portion 2 is made in two discrete, independent parts, whilst the single item of the base portion 1 further comprises flat plate extensions 1h perpendicularly located on either side near the top thereof, wherein these flat plate extensions 1h have an internally threaded hole, whilst the upper basement portion of sheet metal mobile portion 2 is substituted by a perpendicularly bent portion 2h also perforated coaxially with the internally threaded hole of the flat plate extension 1h of the slide base portion 1, so that a bolt 3c passing through these coaxial holes with its head blocked by flat plate extension 1h and with a nut at the other end thereof at the bottom of the flat plate extension 2h of the mobile portion 1 selves as the means of unilaterally tightening the joint.

Whilst in other embodiments a centrally located hole being opened in two halves 11a and 11b at the upper corner (or lower corner in case of the embodiment of FIG. 3) junction of the profiles to be connected is sufficient for tightening the joint of he invention, in the case of the embodiment of FIG. 8a two distinct holes 11a, 11b are necessary in the corresponding chambers 13a, 13b of the profile members being connected.

Employment of the joint of the invention advantageously leads to a novel method of angular connection of hollow profile members made from aluminium, plastics or other materials that offers enhanced speed and is user friendly, this method comprising the following steps:

a. Drilling of a single hole made of two halves 11a, 11b, one half in each of the hollow profile members being brought together for an angular connection, the edges of such profile members having previously being appropriately cut at an angle of half the magnitude of the angle intended by their connection, e.g. being cut at an angle of 45° when the angle intended by their connection is 90°.

b. Inserting the previously assembled joint with a central bolt 3 passing through the upper sheet metal mobile portion 2 and stopping at the underlying base portion 1, through the opening 12a of a chamber 13a of a first one of the pair of hollow profile members to be connected, wherein half of the joint is introduced in this first one of the pair of profile members.

c. Bringing the chamber 13b of the second one of the pair of hollow profile members to be connected in a position wherein the protruding half of the joint is slidably inserted therein, thereby obtaining an accurate coincidence of the previously cut edges of the hollow profile members to be connected and further obtaining the centrally located angular hole 11a, b by coincidence of the two halves 11a, 11b.

d. Employment of a key 14 passing through the angular hole 11a, b and rotation by means of the same of the bolt 3 lying coaxially along the plane of connection of the two hollow profile members that have been connected, until the sharp edges of the upwardly extending sides of the sheet metal portion 2 indent the walls of chambers 13a, 13b thereby leading to a rigid, aligned and angular connection of the abovementioned hollow profile members.

The invention claimed is:

1. Joint for the angular connection of hollow profile members intended to form door/window profile frames, wherein the edges of the hollow profile members have been previously cut at an angle such as to obtain a matching contact following the assembly thereof, the joint comprising a slide base portion (1) with an upper first flat basement (1a) with a centrally located first cavity (1b) and with first side parts symmetrically extending on either side of said first flat basement (1a), each one of said first side parts having planar surfaces (1e) able to come into sliding contact with a wall of each one of a pair of chambers (13a, 13b) of the hollow profile members being brought together for connection, a mobile portion (2) with an upper second flat basement (2a) with a centrally located second cavity (2b) and with second side parts symmetrically extending on either side of said second flat basement (2a), said first and second side parts being symmetrically arranged on either side of a plane of symmetry (x-x') passing through the plane of matching contact of the previously cut edges of said hollow profile members, said mobile portion (2) comprising upwardly extending sides (2e) on either side thereof terminating at sharp edges (2g), said sharp edges (2g) being adapted to produce an indentation effect into the walls of chambers (13a, 13b) and a bolt (3) being employed in a tightening process of the joint, said upwardly extending sides (2e) of said mobile portion (2) being oriented in a direction substantially parallel to the plane of symmetry (x-x'), said bolt (3) being able to pass through a hole (11a,b) of the hollow profile members lying at said plane of symmetry (x-x'), said bolt being able to be screwed to exert an upwardly pushing force onto said mobile portion (2) until said sharp edges (2g) thereof indent the walls of the profile members being connected, characterized in that:

each one of said first side parts comprising a first section (1c) extending into a second convergent surface (1d), said first section (1c) extending substantially parallel to the walls of said hollow profile members whereupon said planar surfaces (1e) are seated and said second convergent surface (1d) extending inwardly in the direction of the walls of said hollow profile members;

said slide base portion (1) comprising a planar recession (1g) close to the junction of said planar surfaces (1e), said planar recession (1g) being seated onto the corner of matching contact of said hollow profile members;

said mobile portion (2) is a sheet metal portion having a configuration similar to the configuration of said slide base portion (1);

each one of said second side parts comprising planar side surfaces (2c) and (2d), each with a length generally equivalent to the length of underlying corresponding said first section (1c) and said second convergent surface (1d) of said slide base portion (1), said mobile portion (2) being superimposed onto said slide base portion (1) so that said second flat basement (2a) is oriented parallel above said underlying first flat basement (1a) in a direction perpendicular to said plane of symmetry (x-x') and so that said planar side surfaces (2c, 2d) of said mobile portion (2) extend correspondingly along said first section (1c) and said second convergent surface (1d) of said slide base portion (1) during insertion of said joint within the hollow profile members and that said said planar side surfaces (2c, 2d) are raised upwardly as said bolt (3) is being screwed to produce the identation effect through said sharp edges (2g) indenting the walls of the profile members.

2. Joint for the angular connection of hollow profile members as claimed in above claim 1, characterized in that said slide base portion (1) further including bent legs (1e'), said bent legs (1e') forming recessions allowing tight fitting therein of said upwardly extending sides (2e) of said sheet metal portion (1), wherein following assembly and introduction of said joint within a junction corner of the hollow profile members being connected, screwing of said bolt (3) leads to said sharp edges (2g) of said mobile portion (2) contacting the walls of said corresponding chambers (13a, 13b) of the profiles being connected, self alignment through perfect convergence of the profiles being connected along the axis of symmetry (x-x') and indentation of said sharp edges (2g) of said sheet metal mobile portion (2) into the walls of said corresponding chambers (13a, 13b) of the profiles being connected after said upwardly extending sides (2e) of said mobile portion (2) have been deflected relatively to said second side parts thereby leading to resilient stresses uniformly applied on either side of the joint being stored in said mobile portion (2), said resilient stresses thereby maintaining the joint in a tightened condition and the profile members rigidly connected.

3. Joint for the angular connection of hollow profile members as claimed in above claim 1, characterized by that said sharp edges (2g) of said mobile portion (2) producing the indentation effect may alternatively take the form of an arrangement of tooth or pointed pin protrusions or razor edge like sharp surfaces, said arrangement of tooth or pointed pin protrusions or razor edge like sharp surfaces taking the form of a single acting indentation effective surface or constituted by a pair of adjacently acting indentation effective surfaces.

4. Joint for the angular connection of hollow profile members as claimed in above claim 3, characterized by that said sharp edges (2g) of said mobile portion (2) producing the indentation effect are included in an independent plate item (15), said plate item (15) being introduced into a recession being formed at the terminals of said upwardly extending sides (2e) of said mobile portion (2).

5. Joint for the angular connection of hollow profile members as claimed in above claim 1, characterized by that said second side parts of said mobile portion (2) end at a bent structure thereby forming a recession (17) for the engagement of a pivotally mounted wire (16) made from steel, said pivotally mounted wire (16) having the form of a Π section with the legs thereof bent to upwardly extending members with sharp edges (16g) producing the profile wall indentation effect and by that said slide base portion (1) being made in two identical portions, symmetrically on either side of said plane of symmetry (x-x'), said two identical portions being pivotally connected around a pivotal axis (60) thereby being appropriate for the connection of hollow profiles forming varying angles at the junction thereof and said sheet metal mobile portion (2) being also adjustable to profile connections at varying angles by movement of said pivotally mounted wire (16).

6. Joint for the angular connection of hollow profile members as claimed in above claim 1, characterized by that said bolt (3) passing through a hole (11a,b) lying at said plane of symmetry (x-x') and exerting when being screwed an upwardly pushing force onto said sheet metal mobile portion (2) until said sharp edges (2g) thereof indent the relatively softer walls of the profile members being connected, passes through an internally threaded hole at said centrally located second cavity (2b) of said mobile portion (2) and subsequently stops by contact of a sharp edge (3b) thereof onto the coaxially underlying said first cavity (1b) of said base portion (1).

7. Joint for the angular connection of hollow profile members as claimed in above claim 6, characterized by that said internally threaded hole at said centrally located second cavity (2b) of said mobile portion (2) is being formed by either expansion of the sheet metal at said second cavity (2b) into a cylindrical collar (19) that is subsequently internally threaded or by the alternative addition, onto said second basement (2a), of either an independent plate (18) having a planar surface (18a) with dimensions to fit onto said second basement (2a) of said mobile portion (2) and a central hole (18b) that is internally threaded and coincides with a hole being opened at said centrally located second cavity (2b) on said second basement (2a) or of an internally threaded cylindrical collar (48) with a body portion (48a) and a central hole (48b) coinciding with said hole being opened at said centrally located second cavity (2b) on said second basement (2a) of the sheet metal portion (2).

8. Joint for the angular connection of hollow profile members as claimed in above claim 1, characterized by that said bolt (3) passing through a hole (11a,b) lying at said plane of symmetry (x-x') and exerting when being screwed an upwardly pushing force onto said mobile portion (2) until said sharp edges (2g) thereof indent the relatively softer walls of the profile members being connected, passes through an internally threaded hole at said centrally located first cavity (1b) of said slide base portion (1), a sharp edge (3b) of said bolt (3) being brought in contact with the coaxially overlying said second cavity (2b) of said mobile portion (2), wherein said upwardly pushing force exerted onto said sheet metal mobile portion (2) is the force being exerted onto said second cavity (2b) of said sheet metal mobile portion (2).

9. Method of angular connection of hollow profile members intended to form door/window profile frames, wherein the edges of the hollow profile members have been previously cut at an angle such as to obtain a matching contact following the assembly thereof and comprise a single hole (11a,b) made of two halves (11a), (11b), one half in each of the hollow profile members being brought together for an angular connection, comprising the following steps:

a. inserting a previously assembled joint with a central bolt (3) passing through an upper sheet metal mobile portion (2) and stopping at an underlying base portion (1) thereof, through an opening (12a) of a chamber (13a) of a first one of the pair of hollow profile members to be connected, wherein half of the joint is introduced in this first one of the pair of profile members, b. bringing a chamber (13b) of the second one of the pair of hollow profile members to be connected in a position wherein the protruding half of the joint is slidably inserted therein, thereby obtaining an accurate coincidence of the previously cut edges of the hollow profile members to be connected and further obtaining said centrally located single angular hole (11a,b) by coincidence of the two halves (11a, 11b), c. employment of a key (14) passing through said single angular hole (11a,b) and rotation by means of the same of said bolt (3) lying coaxially along the plane of connection of the two hollow profile members that have been connected, until the sharp edges (2g) of upwardly extending sides of the sheet metal portion (2) contact the walls of said chambers (13a, 13b), and d. further screwing of said bolt (3) to obtain self alignment through perfect convergence of the profiles being connected along the axis of symmetry x-x' and indentation of said sharp edges (2g) of said sheet metal mobile portion (2) into the walls of said corresponding chambers (13a, 13b) of the profiles being connected whilst the upwardly extending sides (2e) of the sheet metal mobile portion (2) are deflected relatively to the side surfaces (2d) of the sheet metal mobile portion (2) thereby leading to resilient stresses uniformly applied on either side of the joint being stored in said sheet metal mobile portion (2), said resilient stresses thereby maintaining the joint in a tightened condition and the profile members rigidly connected.

* * * * *